Figure 1:
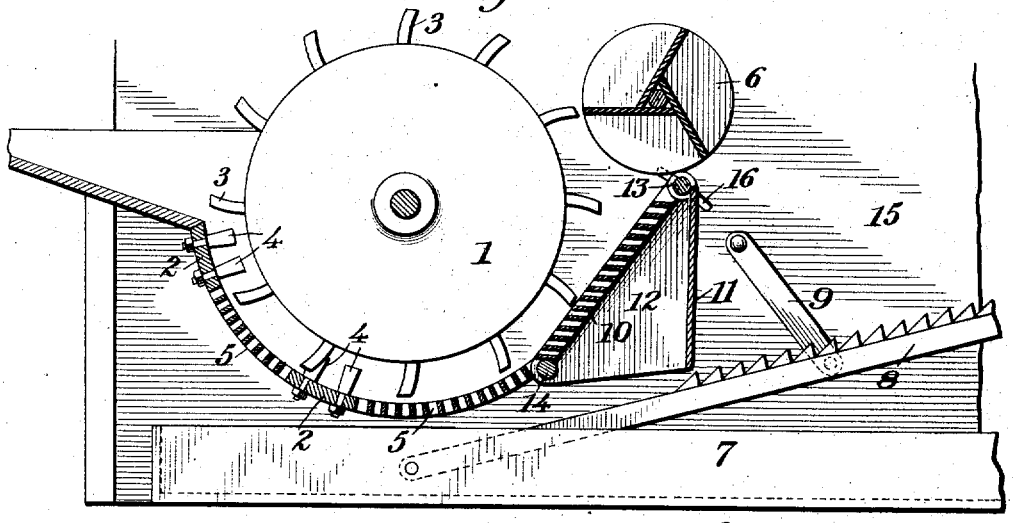

BEST AVAILABLE COPY

No. 11,965. Reissued Feb. 4, 1902.

E. W. FLAGG.

THRESHING MACHINE.

(Application filed Dec. 30, 1901.)

Witnesses:

H. L. Amer.

T. W. Riley.

Inventor

Eli W. Flagg.

By Rexford M. Smith,

Attorney.

UNITED STATES PATENT OFFICE.

ELI W. FLAGG, OF BATTLECREEK, MICHIGAN, ASSIGNOR TO NICHOLS AND SHEPHARD COMPANY, OF BATTLECREEK, MICHIGAN.

THRESHING-MACHINE.

SPECIFICATION forming part of Reissued Letters Patent No. 11,965, dated February 4, 1902.

Original No. 668,041, dated February 12, 1901. Application for reissue filed December 30, 1901. Serial No. 87,850.

*To all whom it may concern:*

Be it known that I, ELI W. FLAGG, a citizen of the United States, residing at Battlecreek, in the county of Calhoun and State of Michigan, have invented a certain new and useful Threshing-Machine, of which the following is a specification, reference being had therein to the accompanying drawings.

This invention relates to threshing-machines; and one object in view is to provide in connection with a threshing-machine an attachment comprising a grate which forms a continuation of the concave and is arranged in rear of the threshing-cylinder and a check-plate located in rear of the grated continuation or extension of the concave for the purpose of stopping or checking the flying grain and delivering the same into the grain-pan, thereby avoiding the necessity of separating the grain from the straw, or, in other words, effecting the separation of a considerable quantity of the kernels from the straw and to that extent relieving the burden of the remainder of the threshing and separating mechanism. The attachment is also adjustable to suit varying conditions of the grain.

Other objects and advantages of the invention will be pointed out in the course of the ensuing description.

The invention consists in a threshing-machine attachment embodying certain novel features and details of construction and arrangement of parts, as hereinafter fully described, illustrated in the drawings, and incorporated in the claims.

Figure 2:
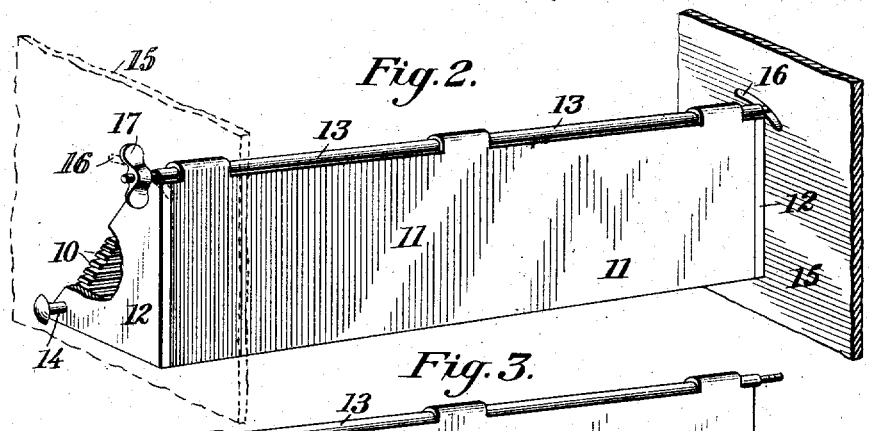
Figure 3:
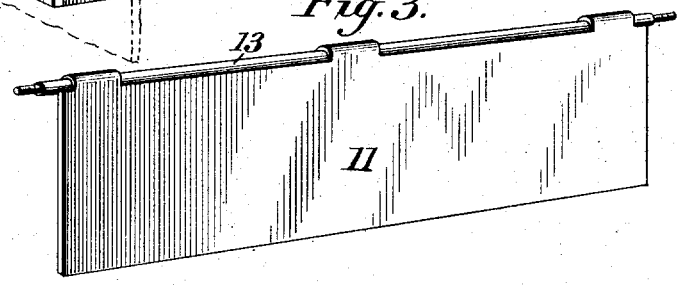

In the accompanying drawings, Figure 1 is a vertical longitudinal sectional view through a sufficient portion of a threshing-machine to illustrate the application of the improved attachment thereto. Fig. 2 is a detail perspective view of the attachment, showing the manner of adjusting and holding the same. Fig. 3 is a detail perspective view of the check-plate, showing the same separate from the remainder of the attachment.

Similar numerals of reference designate corresponding parts in all figures of the drawings.

Referring to the accompanying drawings, 1 designates the cylinder, and 2 the concave, of an ordinary cylinder-and-concave threshing-machine, the cylinder being provided with threshing-teeth 3 and the concave being provided with similar teeth 4, portions of the concave being of grated or slatted form, as shown at 5.

6 designates an ordinary beater located in rear of the threshing-cylinder at a slightly-elevated point.

7 represents the grain-pan, and 8 one of the straw-carrier sections pivotally mounted and swung upon links 9 to oscillate within the threshing-machine in a manner well understood by those familiar with the art to which this invention appertains.

In carrying out the present invention I provide an attachment consisting of an adjustable grate 10, forming, in effect, a continuation or extension of the concave 2, and a checking and directing plate or grain-stop 11, either connected rigidly with the grate 10 by means of triangular-shaped end walls 12 or swung independently and loosely upon a hanger-bar 13, having its ends adjustably mounted in the sides of the threshing-machine. The end walls 12 are only employed where the invention is in the form of an attachment for machines already built and in use, it being obvious that where the invention is incorporated in a machine at the time of manufacture the end walls 12 are not necessary, as the sides of the machine-casing form the end walls of the space between the grate 10 and the checking and directing plate 11.

By reference to Figs. 1 and 2 it will be observed that the grate 10 is connected at its lower inner end to the adjoining rear end of the concave by means of a hinge-pin 14, extending through openings in the end walls 12 and into or through the sides 15 of the machine, where the end walls are not employed, as in the case where the invention is embodied in the machine during the manufacture of the latter the pin 14 will of course have its ends connected directly with the sides of the casing. The hanger bar or rod 13 is arranged at the opposite end of the grate 10 and has its opposite ends adjustably mounted in segmental slots 16 in the slides 15 of the machine-casing, the extremities of the hanger bar or rod being threaded to receive thumb or clamping nuts 17, by means of which the bar 13 may be securely clamped and held after it has been adjusted. By the means described the grate 10 may be adjusted into the desired proximity to the teeth of the threshing-cylinder according to the condition of the material operated upon, the straw being swept across the grate 10 by the cylinder and forced over the hanger bar or rod 13 by the beater and thence onto the straw-carrier sections.

It will be apparent that as the straw flows over the grate 10 the flying grain passes between the slats of the grate and is arrested by the check-plate 11, which causes the grain to fall into or upon the grain-pan beneath.

Instead of rigidly connecting the grate 10 and check-plate 11 the latter may be constructed in a separate piece, as shown at Fig. 3, and hung upon the hanger bar or rod 13, so as to assume a vertical position, while at the same time it is free to swing or yield under the action of the grain impinging against the same. It will thus be seen that the grate 10, which forms, in effect, a continuation or extension of the concave, may be adjusted so as to bring the working surface nearer to or farther from the teeth of the threshing-cylinder; also, that the checking and directing plate, being located in rear of the grate, serves to stop the flying grain and deliver the same to the grain-pan, thereby avoiding the necessity of subsequently separating the grain from the straw, or, in other words, effecting the separation of a considerable quantity of the kernels from the straw and to that extent relieving the burden of the remainder of the threshing and separating mechanism. The attachment is simple and economical and may be readily applied to machines already in use. If desired, the grate and check-plate, either or both, may be fixed or stationary, as in some cases it may not be necessary to make the grate adjustable or hang the check-plate pivotally. Thus it will be seen that in the case of a new machine the sides of the machine-casing may and probably will be made to constitute the end walls of the space or chamber between the grate and the checking and directing plate; but in the form of an attachment the end walls 12 may, as shown, be employed. Furthermore, the checking and directing plate may be supported in various ways, as long as said plate is arranged to extend downward from a line adjacent to the upper edge of the grate.

Having thus described the invention, what is claimed as new, and desired to be secured by Letters Patent, is—

1. The combination of a toothed cylinder, a concave comprising a concave portion, and a grate close to the sweep of the cylinder-teeth steeply inclined and deflecting the straw upwardly, while permitting kernels to pass through it, and a checking and directing plate extending downward from a line adjacent to the upper edge of the grate.

2. The combination with a threshing-cylinder and concave, of a grate forming an extension of the rear end of the concave, a checking and directing plate arranged behind the grate, and supporting means common to both the grate and check-plate, substantially as described.

3. The combination with the cylinder and concave of a threshing-machine, of an inclined grate, a check-plate arranged in rear of the cylinder and behind the grate and adapted to direct the flying grain into the grain-pan, and end walls extending from the grate rearward to the check-plate, substantially as described.

4. The combination with the cylinder and concave of a threshing-machine, of a grate pivotally associated with the rear end of the concave, a movable hanger-bar for adjusting the opposite end of said grate, and a check-plate arranged in rear of the grate and connected with said hanger-bar, substantially as described.

5. The combination with the cylinder and concave of a threshing-machine, of a hinged grate, a pivotally-hung check-plate located behind the grate and serving as a stop for the flying grain passing through the grate, and a rod forming a common support for the check-plate and free end of the grate, substantially as set forth.

In testimony whereof I affix my signature in presence of two witnesses.

ELI W. FLAGG.

Witnesses:
CHESTER P. ALDRICH,
ALFRED H. HULSCHER.